United States Patent [19]

Joseph

[11] 4,024,771
[45] May 24, 1977

[54] VARIABLE SPEED RATIO DRIVE MECHANISM

[76] Inventor: Beresford Clair Joseph, 378 Victoria St., Brunswick, Victoria, Australia

[22] Filed: Oct. 2, 1975

[21] Appl. No.: 619,036

[30] Foreign Application Priority Data
Oct. 2, 1974  Australia ........................... 9137/74

[52] U.S. Cl. ................................................ 74/198
[51] Int. Cl.² ...................................... F16H 15/26
[58] Field of Search ............................... 74/198, 200

[56] References Cited
UNITED STATES PATENTS

| | | | |
|---|---|---|---|
| 2,272,509 | 2/1942 | Cavallo | 74/198 |
| 2,490,525 | 12/1949 | Koller | 74/198 |
| 3,272,025 | 9/1966 | Stieber | 74/198 |

FOREIGN PATENTS OR APPLICATIONS

| | | | |
|---|---|---|---|
| 815,862 | 7/1937 | France | 74/198 |
| 844,443 | 7/1953 | Germany | 74/198 |

Primary Examiner—Samuel Scott
Assistant Examiner—Allan R. Burke
Attorney, Agent, or Firm—Cushman, Darby & Cushman

[57] ABSTRACT

Variable speed ratio drive mechanism having a pair of opposed discs with facing dished surfaces and a spherical ball held between the discs and contacting said surfaces, each disc being rotatable to drive the other by frictional driving of the ball, one disc being movable so that its axis of rotation remains constantly angularly disposed relative to the axis of the other to effect variation in the distances of the points of contact of the disc surfaces with the ball to thereby effect variation of drive ratio of the mechanism.

6 Claims, 6 Drawing Figures

VARIABLE SPEED RATIO DRIVE MECHANISM

BACKGROUND OF THE INVENTION i. Field of the Invention

This invention relates to a variable speed ratio drive mechanism of the kind comprising a pair of friction members mounted for rotation about respective axes of rotation, said friction members presenting opposed friction surfaces at facing ends thereof, said surfaces both frictionally engaging, at respective points of contact thereon, a spherical ball located between the surfaces whereby, when the points of contact are spaced away from the respective axes, rotary motion of one friction member can be transmitted to the other via said ball, and means being provided for altering the distance of at least one of the points of contact from the axis of its associated friction member whereby to vary the drive ratio between said members; said surfaces being concave and formed as surfaces of revolution defined about the axes of respective friction members, the radii of curvature of the respective surfaces being everywhere greater than the radius of curvature of the ball and said ball being maintained captured between said surfaces.

ii. Description of the Prior Art

French Pat. No. 815,862, for example, discloses a mechanism of the above kind in which ratio changing is effected by moving the said one friction member, this member being carried by a shaft mounted in bearings which are themselves pivotal relative to the other friction member. The coupling of input and output shafts to the mechanism is thus complicated and one object of the invention is to provide an improved mechanism of the above kind in which this difficulty is lessened. The mechanism of French Pat. No. 815,862 is also such that the point of contact of the ball with one of the friction surfaces remains substantially constantly spaced from the axis of the associated friction member, thus accentuating wear at this point. Furthermore, the range of available ratios is correspondingly less than if the points of contact at both friction surfaces are variable.

BRIEF SUMMARY OF THE INVENTION

The presnet invention is characterised in that said means is operable to alter the relative positions of said friction members to effect said altering of said distance by effecting relative movement between the axes whilst maintaining them in substantially constant non-parallel angular relationship.

In a particularly preferred form of the invention, friction surfaces are part spherical and said axis of rotation of said one friction member is mounted for movement relative to the other in a plane containing the axes of both members, and on a circular path of radius equal to the sum of the radii of curvature of the friction surfaces less twice the radius of the ball.

BRIEF DESCRIPTION OF THE SEVERAL VIEWS OF THE DRAWING

The invention is further described with reference to the accompanying drawing in which.

DETAILED DESCRIPTION OF THE INVENTION

Figure 1:
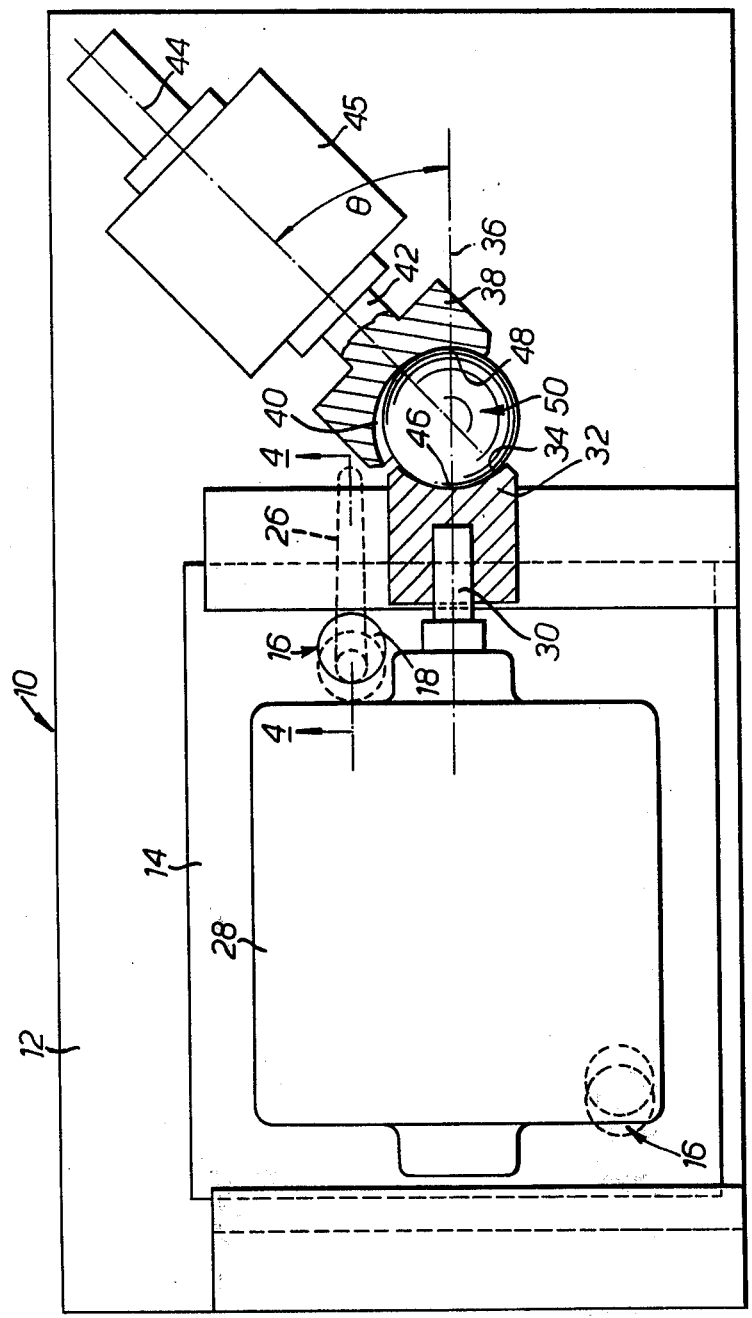
FIG. 1 is a plan view of a variable speed ratio drive mechanism constructed in accordance with the invention.

The mechanism 10 shown in FIGS. 1 to 6 includes a rectangular base plate 12. This carries thereon a rectangular motor platform 14. This is coupled to base plate 12 by two cam mechanisms 16. These are identical and are disposed between diagonally opposed corners of platform 14. Each is of the form shown in FIG. 4, comprising a circular disc 18 which is received in a mating circular opening 20 in platform 14. A second disc 24 of the same diameter as disc 18 is secured to the underside of disc 18, the axes 18a, 24a of the discs being eccentric to each other. Disc 24 is received in a circular opening 23 in plate 12. A radially projecting lever 26 is secured to the underside of disc 24. By turning lever 26, the side surface of disc 18 can be caused to engage the side surface of opening 20 to effect movement of platform 14 in a circular path, the path having a radius equal to the distance of the axis 18a of disc 18 from the axis 24a of disc 24.

Platform 14 carries an electric motor 28 with a drive shaft 30 projecting from one end. This carries at its end a friction member 32 having at its outer transverse face a part-spherical surface 34 co-axially formed with the axis 36 of shaft 30.

A second friction member 38 is mounted to one end of a shaft 42. Shaft 42 has an axis 44 which is coplanar with axis 36, the plane of these axes being parallel to but spaced above the median plane of platform 14. Member 38 has a part-spherical concave friction surface 40 at its outer end member 38 being positioned such that surface 40 is in opposed relationship to surface 34. Both surfaces 34, 40 engage, at respective points of contact 46, 48, the outer surface of a spherical ball 50 located between members 32, 38. Shaft 42 is freely rotatable in a bearing 45 affixed to base plate 12 such that the axis 44 makes an angle $\theta$ to the projected axis 36 which is approximately 45°. Although, as mentioned, motor 28 is movable by moving lever 26, this angle $\theta$ is maintained constant during such movement.

Figure 3:
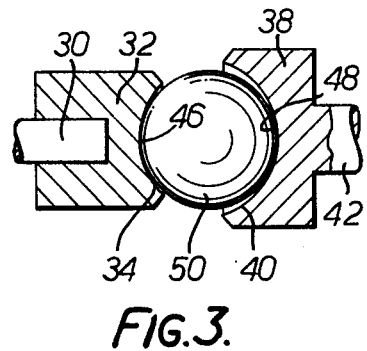
FIG. 3 is a fragmentary side view of portion of the mechanism of FIG. 1.
Figure 4:
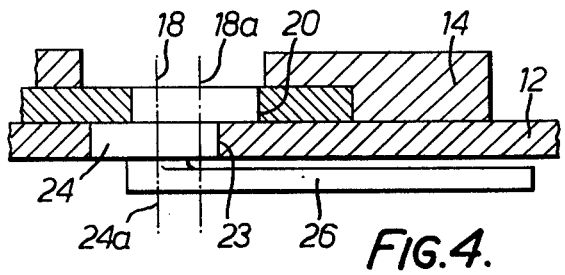
FIG. 4 is a fragmentary cross-sectional view of a mounting structure incorporated into the mechanism of FIG. 1.
Figure 5:
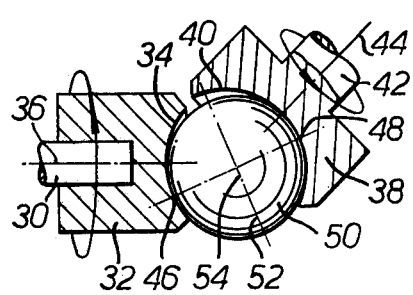
FIGS. 5 and 6 are fragmentary side views illustrating positions of components of the mechanism of FIG. 1 in different drive ratios of the mechanism.

As can be seen from inspection of FIG. 1 together with FIG. 3, ball 50 is held captive between the surfaces 34 and 40. The points of contact 46, 48 with the surfaces lie in the same plane as the plane containing the axes 36 and 44, but can be positioned variably from the respective axes 36 and 44 by movement of lever 26 to cause motor 28 and member 32 to execute the described circular motion. For example, in the position shown in FIG. 1, the point of contact 46 is on axis 36 whilst point 48 is spaced somewhat from axis 44. Under these conditions, substantially no rotation of ball 50 will occur when shaft 30 is rotated pursuant to operation of motor 28, the ball tending to merely remain stationary whilst member 32 rotates therearound. Accordingly, there will be substantially no output to shaft 44. However, when member 32 is positioned as shown in FIG. 5, the points of contact 46, 48 will shift so that the point of contact 46 is to one side of shaft axis 36 whilst the point of contact 48 is also to one side of the axis 44. Under these conditions, rotation of member 32 will cause ball 50 to rotate about the axis 52 which is normal to the plane 54. Plane 54 contains points 46, 48 and is normal to the plane of axes 36, 44. Plane 54 passes through the centre of ball 50. Rotation of shaft 32 will thus cause member 38 and shaft 42 to be rotated correspondingly. The distance from point 46 to axix 36 is somewhat greater than that between axis 44 and point 48 so that the drive will be on a greater than unity drive ratio at this setting, the rotation of shaft 42 being in the opposite sense to that of shaft 30.

Figure 6:
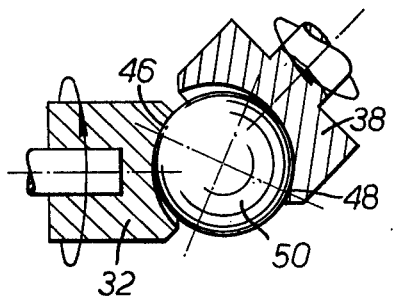

In FIG. 6, member 32 is shown positioned so that the point of contact 46 is shifted to the opposite side of axis 36 to that shown in FIG. 5 to be positioned from the axis 36 approximately the same distance as that shown in FIG. 5. In this case, the point of contact 48 is still to the same side of axis 44 as was the case in FIG. 5 but is shifted further around to be more distant therefrom. In this case then, shaft 42 will be rotated in the same direction as shaft 30 and at a greater rate than in the case illustrated in FIG. 5.

It will be appreciated that it is possible to achieve wide variation of drive ratios by the described variable positioning of member 30.

Shafts 42 and 30 are journalled so as to resist axial movement away from ball 50 and may be arranged to impart pressure against the ball. This may be done by providing thrust bearings in motor 30 and on the bearing which supports shaft 42 and by preloading these. The preloading may be a fixed loading or could be effected via resilient members which resiliently bias the members 32, 38 together. It will be appreciated that, under load, there is a tendency towards tighter wedging of ball 50 between members 32, 38 so that firm contact between the ball and surfaces 34, 40 is maintained. That this increased wedging takes place can be appreciated from FIG. 3, by imagining member 38 to be held stationary and member 32 to be rotated. This would correspond to a condition of extreme loading and it will be noted that the tendency is then for contact point 46 to rise (as viewed in FIG. 3) around the upper part of surface 34 thus causing the ball to more firmly wedge. Even in cases where no particular provision is made for preloading of the bearings, the mechanism will still operate, the ball merely assuming a disposition distant from the plane containing axes 36, 40 at which it is wedged between the two surfaces 34, 40.

Of course, the particular described angular disposition of shafts 30 and 42 is by no means essential as other dispositions may be employed. The necessary motion of platform 14 is still circular, however, regardless of the angular disposition of the shafts 30, 42.

Figure 2:
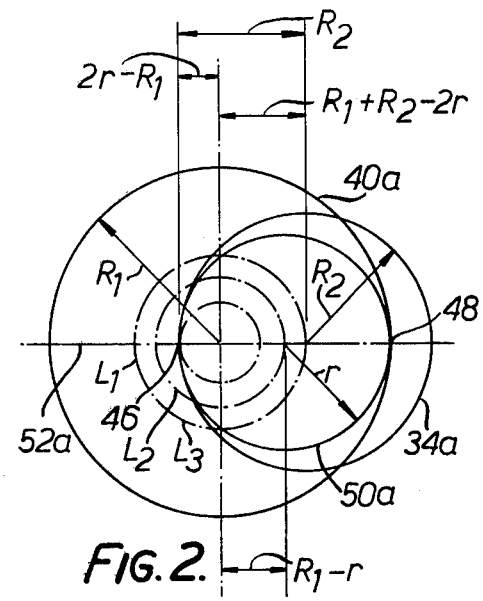
FIG. 2 is a diagram illustrating the mode of operation of the mechanism of FIG. 1.

That the desired motion for member 32 is circular, can be appreciated from FIG. 2. Here, circle 40a represents the intersection of surface 40 with the plane containing the axes 36 and 44, circle 34a represents the intersection of surface 34 with such plane and circle 50a represents the intersection of the surface of ball 50 with such plane. For further generality of the derivation of the shape, the circles 40a and 34a are shown to be of different diameters although in the arrangement of FIG. 1, with axes at an angle of 45°, these can be the same diameter. Normally, where the shaft axes are maintained parallel, it is preferable that the diameters of circles 40 and 34a differ in order to increase the obtainable speed ratio variation. Because ball 50 is held between two opposite points, it can only assume a stable position if the points of contact 46, 48 are on a straight line 52a. Such line must also always contact the centres of circles 40a, 50a since two contacting circles must always have centers on a straight line passing through the contact point. Then, the motion of the centre of ball 50 must always be on a circular locus L2 centred about the centre of circle 40a and of radius (R1 − r) where R1 is the radius of circle 40a and r is the radius of circle 50a. It will be seen that as the centre of circle 50a thus moves about the centre of circle 40a and the line 52a, which represents the line joining the momentary points of contact 46, 48, always passes through the centre of circle 40a. The locus L1 of point 46 is also a circle about the centre of circle 40a this having a radius (2r − R1). Furthermore, since the centre of circle 40a is always on line 52a and distant R2 from point 46 its locus L3 of movement is a circle about the centre of circle 40a, locus L3 being distant R2 from point 46 so that its radius is (R1 + R2 − 2r). The positions of the axes 36, 44 are not shown in FIG. 2, but it will be easily appreciated that axis 44 can be positioned to pass through the centre of curvature of circle 40a at a desired fixed angle, such as is the case in the described embodiment and axis 36 can assume any desired orientation relative to circle 34a, so long as it passes through the centre of circle 34a.

In the described embodiment, surfaces 34 and 40 are part spherical, but they could be of other configuration such as elipsoidal with major axes of the elipsoids normal to the axes of the respective members, 32, 38. In the latter case the necessary movement of member 32 is on an eliptical path.

In the described embodiment, too, the member 32 is carried by the shaft of a motor although this is not essential. The member 38 may, instead, be carried by the shaft of the motor to avoid the necessity of bodily movement of the motor.

I claim:

1. A variable speed ratio drive mechanism comprising a pair of friction members mounted for rotation about respective axes of rotation, said friction members presenting opposed friction surfaces at facing ends thereof, said surfaces both frictionally engaging, at respective points of contact thereon, a spherical ball located between the surfaces whereby, when the points of contact are spaced away from the respective axes, rotary motion of one friction member can be transmitted to the other via said ball, and means being provided for altering the distance of at least one of the points of contact from the axis of its associated friction member whereby to vary the drive ratio between said members; said surfaces being part-spherical concavities with centres on respective friction member axes, the radii of curvature of the respective surfaces being greater than the radius of curvature of the ball and said ball being maintained captured between said surfaces, said means mounting said friction members with axes in non-aligned angular relationship and substantially in a common plane and said means being operable to effect movement of one friction member relative to the other on a circular path of radius equal to the sum of the radii of curvature of the friction surfaces less twice the radius of said ball, while maintaining said angular relationship substantially constant, whereby said movement effects said altering of said distance to vary said ratio.

2. A variable speed ratio drive mechanism as claimed in claim 1 wherein said ball is of slightly less radius than the radius of curvature of said friction surfaces.

3. A variable speed ratio drive mechanism as claimed in claim 1 wherein the axis of said one friction member makes an angle of substantially 45° to the projected axis of the other member.

4. A variable speed ratio drive mechanism as claimed in claim 2 wherein the said one member is carried by a mounting coupled to a base by a plurality of bearing devices which constrain said one member for movement on said circular path, said axis of rotation of said other member being fixed relative to the base.

5. A variable speed ratio drive mechanism as claimed in claim 4 wherein said bearing devices each include two partly overlying circular apertures, one in said base and one in said mounting and two circular bearing elements a separate one being received in each aperture and the bearing elements being connected together with axes parallel to one another and normal to said plane, and offset one from the other by an amount equal to the radius of said circular path, positioning means being provided for rotating that bearing element, of at least one of said bearing devices, which is in said base plate about its own axis.

6. A variable speed ratio drive mechanism as claimed in claim 5 wherein said positioning means comprises a lever affixed to the last-mentioned bearing element.

* * * * *